(12) United States Patent
Kimura et al.

(10) Patent No.: US 7,717,006 B2
(45) Date of Patent: May 18, 2010

(54) SHIFT RANGE SWITCHING APPARATUS AND METHOD FOR SWITCHING SHIFT RANGE

(75) Inventors: Kiyoshi Kimura, Obu (JP); Taku Itoh, Chita-gun (JP); Shigeru Yoshiyama, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 418 days.

(21) Appl. No.: 11/641,019

(22) Filed: Dec. 19, 2006

(65) Prior Publication Data
US 2007/0144287 A1    Jun. 28, 2007

(30) Foreign Application Priority Data
Dec. 22, 2005  (JP)  ............................. 2005-369105

(51) Int. Cl.
*F16H 59/00*  (2006.01)
(52) U.S. Cl. ..................................... 74/335; 74/473.12
(58) Field of Classification Search .................. 74/335, 74/469–473.37, 473.12; 701/61
See application file for complete search history.

(56) References Cited

U.S. PATENT DOCUMENTS

| 6,589,133 | B2 * | 7/2003 | Kusafuka et al. | ............... 477/97 |
| 2004/0016314 | A1 * | 1/2004 | Satoh et al. | .................. 74/335 |
| 2005/0174084 | A1 | 8/2005 | Nakai et al. | |
| 2006/0138880 | A1 | 6/2006 | Kimura et al. | |

FOREIGN PATENT DOCUMENTS

JP    2001-271917    10/2001

* cited by examiner

*Primary Examiner*—David D Le
*Assistant Examiner*—Derek D Knight
(74) *Attorney, Agent, or Firm*—Nixon & Vanderhye PC

(57) ABSTRACT

A shift range switching apparatus connects with a motor for switching a shift range of an automatic transmission. The shift range switching apparatus includes a switching unit that is operated by the motor for switching the shift range. The shift range switching apparatus further includes a control unit that outputs a driving current to the motor for switching the shift range to one of a P range, an R range, an N range, and a D range. The control unit controls the driving current at one of a plurality of set values in accordance with a switching pattern of the shift range. The switching pattern may be defined by a combination of two of the P range, the R range, the N range, and the D range.

12 Claims, 5 Drawing Sheets

SHIFT RANGE SWITCHING APPARATUS AND METHOD FOR SWITCHING SHIFT RANGE

CROSS REFERENCE TO RELATED APPLICATIONS

This application is based on and incorporates herein by reference Japanese Patent Application No. 2005-369105 filed on Dec. 22, 2005.

FIELD OF THE INVENTION

The present invention relates to a shift range switching apparatus for an automatic transmission. The present invention also relates to a method for switching the shift range of the automatic transmission.

BACKGROUND OF THE INVENTION

In recent years, a shift by-wire system is adopted in vehicle control. For example, a shift by-wire system includes an actuator for changing of a vehicle state. The actuator is electrically controlled with a by-wire control circuit in accordance with a passenger's instructions. According to JP-A-2001-271917, the shift range of an automatic transmission of a vehicle is changed in accordance with a vehicle passenger's instructions in a shift by-wire system.

In this structure, a range position switching unit switches the shift range of an automatic transmission according to a driving current, which is output from a range control unit.

The range control unit sets the driving current in order to steadily switch the shift range of the automatic transmission. The range position switching unit includes a motor that regularly generates driving force sufficient to switch the shift range of the automatic transmission.

By contrast, the driving force required for switching varies according to a switching pattern of the shift range in the automatic transmission. For example, when the shift range of the automatic transmission is present in a P range, rotation of an output shaft of the automatic transmission is mechanically restricted by a lock mechanism. Therefore, when the shift range of the automatic transmission is switched over from the P range to an R range, force is needed for release of the lock mechanism. Consequently, when the shift range is switched over from the P range to the R range, the maximum driving force is required of the motor of the range position switching unit. Hereupon, output of the motor of the range position switching unit is set on the basis of the driving force, which is required when the shift range of the automatic transmission is switched over from the P range to the R range.

However, when the switching pattern of the shift range of the automatic transmission is other than switching-over from the P range to the R range, the shift range can be switched over even when the driving force generated from a motor is small. Thereby, even when the switching pattern of the shift range is other than switching-over from the P range to the R range, the driving current is supplied to the motor to correspond to the maximum driving force, which affords switching-over from the P range to the R range. Consequently, power consumption of the motor increases. In addition, the driving force increases a load applied to the range position switching unit and the automatic transmission.

SUMMARY OF THE INVENTION

In view of the foregoing and other problems, it is an object of the present invention to produce a shift range switching apparatus for switching a shift range of an automatic transmission, the shift range switching apparatus being capable of reducing power consumption and a load applied to a component therein. It is another object of the present invention to produce a method for switching the shift range of the automatic transmission.

According to one aspect of the present invention, a shift range switching apparatus, which connects with a motor for switching a shift range of an automatic transmission, includes a switching unit that is operated by the motor for switching the shift range. The shift range switching apparatus further includes a control unit that outputs a driving current to the motor for switching the shift range to one of a P range, an R range, an N range, and a D range. The control unit controls the driving current at one of a plurality of set values in accordance with a switching pattern of the shift range. The switching pattern may be a combination of two of the P range, the R range, the N range, and the D range.

According to another aspect of the present invention, a method, which is for switching a shift range of an automatic transmission, includes controlling a driving current, which is output to a motor for switching the shift range, at one of a plurality of set values in accordance with a switching pattern of the shift range. The switching pattern is a combination of two of a P range, an R range, an N range, and a D range.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Example Embodiment

Figure 1:
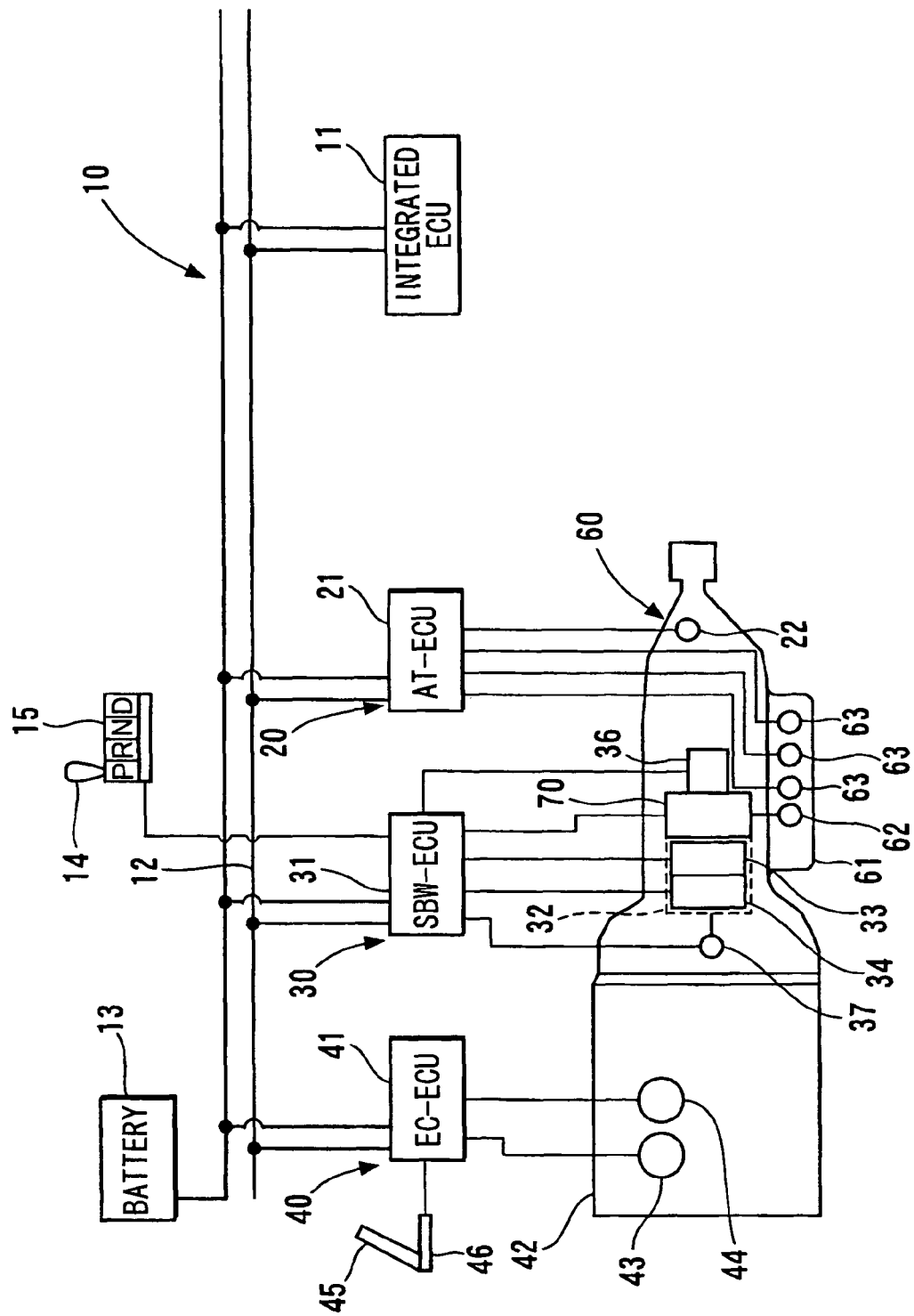
FIG. 1 is a schematic view showing a vehicle control system.

As shown in FIG. 1, a vehicle control system 10 mounted on, for example, a four-wheeled vehicle. The vehicle control system 10 includes an automatic transmission controller 20, a shift by-wire device (SBW device) 30, an engine controller 40, an integrated electronic control unit (ECU) 11, and the like.

The automatic transmission controller 20, the SBW device 30, and the engine controller 40 respectively include AT-ECU 21, SBW-ECU 31, and EC-ECU 41. Each of the integrated ECU 11, the AT-ECU 21, the SBW-ECU 31, and the EC-ECU 41 includes an electric circuit mainly constructed of a microcomputer. Each of the integrated ECU 11, the AT-ECU 21, the SBW-ECU 31, and the EC-ECU 41 electrically or optically connects to one another via an in-vehicle LAN circuit 12. In addition, the integrated ECU 11, the AT-ECU 21, the SBW- ECU 31, and the EC-ECU 41 electrically connect to a battery 13. The battery 13 serves as a vehicle electric source. The integrated ECU 11, the AT-ECU 21, the SBW-ECU 31, and the EC-ECU 41 are driven by electric power supplied from the battery 13. The integrated ECU 11 cooperates with the AT-ECU 21, the SBW-ECU 31, and the EC-ECU 41 to control the whole vehicle control system 10. Voltage of the battery 13 is detected by the integrated ECU 11. That is, the integrated ECU 11 also functions as a voltage detection unit.

The automatic transmission controller 20 drives an automatic transmission 60 by controlling hydraulic pressure. The automatic transmission 60 inputs torque from an engine 42, and performs gear change therein, thereby outputting the converted torque.

The automatic transmission controller 20 includes a hydraulic circuit 61 that switches a shift range and the gear ratio of the automatic transmission 60. The automatic transmission 60 has shift ranges including travel ranges and non-travel ranges. The travel ranges include a D range and an R range, which are respectively a forward range and a backward range. The non-travel ranges include a P range and an N range, which are respectively a parking range and a neutral range. The automatic transmission 60 includes a manual valve 62 for selecting a range position. The manual valve 62 operates to switch the hydraulic circuit 61. The manual valve 62 switches the hydraulic circuit 61 whereby the automatic transmission 60 is set to be in one of the shift ranges. The automatic transmission 60 includes multiple friction engagement elements that are clamped in one of the shift ranges or one of the gear ratios. Thereby, the respective friction engagement elements are clamped or released by hydraulic pressure supplied from the solenoid valves 63.

The AT-ECU 21 electrically connects to electric elements such as the solenoid valves 63 of the hydraulic circuit 61. Thereby, the AT-ECU 21 electrically controls hydraulic pressures output from each of the solenoid valves 63, so that each of the friction engagement elements of the automatic transmission 60 is clamped or released. In addition, in this embodiment, the AT-ECU 21 electrically connects to a vehicle speed sensor 22 that detects a vehicle speed in accordance with a rotation speed of, for example, an output shaft of the automatic transmission 60. The AT-ECU 21 receives a detection signal output from the vehicle speed sensor 22 to detect a vehicle speed for controlling each solenoid valve 63.

The SBW device 30 includes an actuator 32 that drives the manual valve 62 of the automatic transmission 60. The actuator 32 serves as a range position switching unit. The actuator 32 is electromagnetically operated. The actuator 32 includes a motor 33, an encoder 34, and a driving force transmission unit 70. The SBW-ECU 31 outputs a driving signal to the motor 33. Thereby, the motor 33 rotates a shaft (not shown) in accordance with a driving signal, which is input from the SBW-ECU 31. Rotational motions of the motor 33 are reduced in speed by a reduction gear (not shown), and are transmitted to the driving force transmission unit 70. The driving force transmission unit 70 transmits rotational driving force, which is output from the motor 33, to the manual valve 62. In this manner, the SBW-ECU 31 serves as a range control unit that controls a magnitude of driving current being supplied to the motor 33 of the actuator 32.

Figure 2:
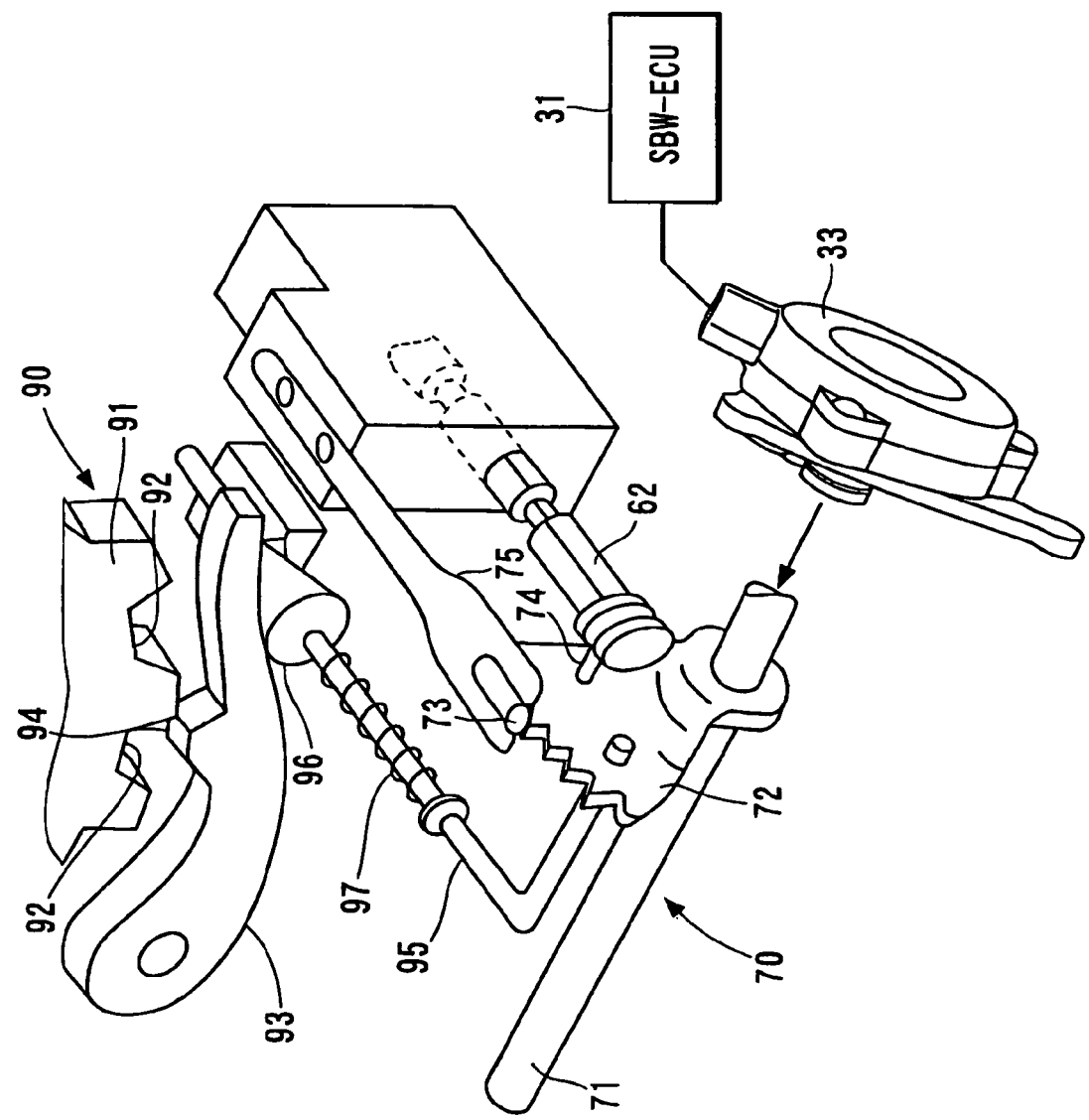
FIG. 2 is a perspective schematic view showing a driving force transmission unit of the vehicle control system.

As shown in FIG. 2, the driving force transmission unit 70 includes a drive shaft 71, a detent plate 72, and a stopper 73. The drive shaft 71 connects to a shaft (not shown) of the motor 33, thereby being rotationally driven by the motor 33. The detent plate 72 is integrated with the drive shaft 71. The detent plate 72 extends radially outward from the drive shaft 71. In this structure, the detent plate 72 together with the drive shaft 71 is rotationally driven by the motor 33. A pin 74 is mounted on the detent plate 72. The pin 74 projects in parallel with the drive shaft 71. The pin 74 connects to the manual valve 62. The detent plate 72 rotates together with the drive shaft 71, so that the manual valve 62 axially moves back and forth. The driving force transmission unit 70 converts rotational driving force of the motor 33 into linear motions, and transmits the linear motions to the manual valve 62.

Figure 3:
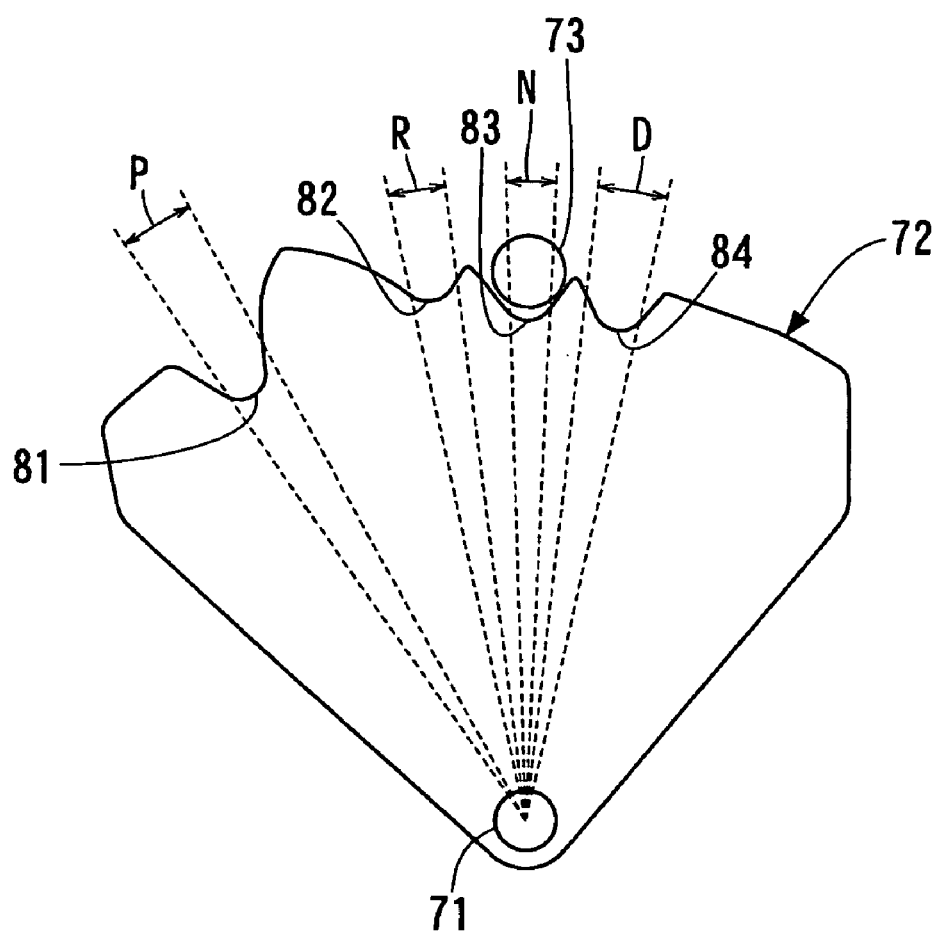
FIG. 3 is a schematic front view showing a detent plate of the driving force transmission unit.

As shown in FIG. 3, the detent plate 72 includes multiple recesses 81, 82, 83, 84 on a radially opposite side to the drive shaft 71. The recesses 81, 82, 83, 84 are respectively formed to correspond to the P range, the R range, the N range, and the D range, which are shift ranges of the automatic transmission. As referred to FIG. 2, the stopper 73 is supported on a tip end of a leaf spring 75. The stopper 73 engages with one of the recesses 81, 82, 83, 84 of the detent plate 72 whereby an axial position of the manual valve 62 is determined. When torque is applied to the detent plate 72 via the drive shaft 71, the stopper 73 is moved to one of adjacent recesses. The motor 33 rotates the drive shaft 71 whereby the axial position of the manual valve 62 is operated, so that the shift range of the automatic transmission 60 is changed.

A parking lock 90 is mounted on the automatic transmission 60. A recess 92 is formed on an outer periphery of a parking gear 91. In the parking lock 90, a pawl 94 of a lock arm 93 is caused to gear with the recess 92 of the parking gear 91, so that rotation of the output shaft of the automatic transmission 60 is restricted. A rod 95 of the parking lock 90 is in a substantially L-shape. The rod 95 is fixed at one end thereof to the detent plate 72. The rod 95 connects at the other end thereof to a cone head 96, which is in a tapered cone shape. The cone head 96 is axially movable. The cone head 96 is urged toward a lock arm 93 by a spring 97. The detent plate 72 rotates, thereby axially reciprocating the cone head 96, so that the cone head 96 drives the lock arm 93 vertically in FIG. 2. When the detent plate 72 rotates to an angle, at which the recess 81 of the detent plate 72 and the stopper 73 engage with each other, the manual valve 62 is switched over to the P range and the cone head 96 pushes the lock arm 93. Thus, the pawl 94 of the lock arm 93 is caused to gear with the recess 92 of the parking gear 91. Consequently, rotation of the output shaft of the automatic transmission 60 is mechanically restricted.

As referred to FIG. 1, a neutral switch 36 includes an actual range detection unit that detects an actual shift range (actual range) of the automatic transmission 60. The neutral switch 36 detects an axial position of the manual valve 62. The neutral switch 36 detects the axial position of the manual valve 62 in accordance with the rotation angle of the drive shaft 71 shown in FIG. 2, or the rotation angle of the detent plate 72. The axial position of the manual valve 62 corresponds to one of the P range, the R range, the N range, and the D range.

The neutral switch 36 outputs the detected position of the manual valve 62 as an electric signal to the SBW-ECU 31. The neutral switch 36 may directly detect the axial position of the manual valve 62 instead of indirectly detecting the axial position in accordance with the rotation angle of the detent plate 72. The neutral switch 36 may detect the position of the manual valve 62 in accordance with the rotation angle of the drive shaft 71.

As referred to FIG. 1, the SBW-ECU 31 electrically connects to the motor 33 and the encoder 34 of the actuator 32, the neutral switch 36, and a selector sensor 15 of a vehicle range selector 14. A vehicle passenger inputs a desired shift range by operating the range selector 14. The selector sensor 15 detects that range (instruction range), which the vehicle passenger operates the range selector 14 to instruct. The selector sensor 15 outputs the detected signal to the SBW-ECU 31.

The encoder 34 includes, for example, a rotary encoder to output a pulse signal corresponding to the rotation angle of the motor 33. The SBW-ECU 31 counts pulse signals output from the encoder 34 to detect the rotation angle of the motor 33. The shift range of the automatic transmission 60 is changed corresponding to the rotation angle of the motor 33. Therefore, the rotation angle of the motor 33 detected by counting the pulse signals output from the encoder 34 indirectly indicates the actual range of the automatic transmission 60. In this embodiment, the neutral switch 36 detects the axial position of the manual valve 62, which is driven via the detent plate 72, to output the signal to the SBW-ECU 31. Thereby, the SBW-ECU 31 detects the position of the manual valve 62, which corresponds to the actual range of the automatic transmission 60. In this manner, the SBW-ECU 31 receives output signals from the encoder 34, the neutral switch 36, and the selector sensor 15, so that the SBW-ECU 31 controls the signal, which is output to the motor 33, on the basis of physical quantities represented by the detection signals.

The SBW-ECU 31 connects to a temperature sensor 37, which serves as temperature detection unit to detect temperature in the vicinity of the actuator 32. The temperature sensor 37 outputs an electric signal, which corresponds to the detected temperature, to the SBW-ECU 31. The SBW-ECU 31 acquires information representing temperature in the vicinity of the actuator 32 in accordance with the electric signal input from the temperature sensor 37. The temperature sensor 37 may be mounted in the vicinity of the actuator 32, and may include a temperature sensor that detects temperature of an engine room, on which the engine 42 is mounted in the vehicle.

The EC-ECU 41 electrically connects to a throttle 43 and an injector 44 of the engine 42 of the vehicle. The EC-ECU 41 further electrically connects to an accelerator sensor 46 of an accelerator pedal 45. The throttle 43 regulates a flow rate of an intake flowing through an intake passage of the engine 42. The injector 44 regulates a quantity of fuel jetted into the intake passage of the engine 42 or fuel jetted into respective cylinders. The accelerator sensor 46 detects a manipulated variable of the accelerator pedal 45 by the vehicle passenger to output the detected signal to the EC-ECU 41. In this construction, when the vehicle passenger manipulates the accelerator pedal 45, the EC-ECU 41 electrically controls the throttle 43 and the injector 44 on the basis of the manipulation. Thus, the EC-ECU 41 regulates a rotation speed and an output torque of the engine 42.

Figure 4:
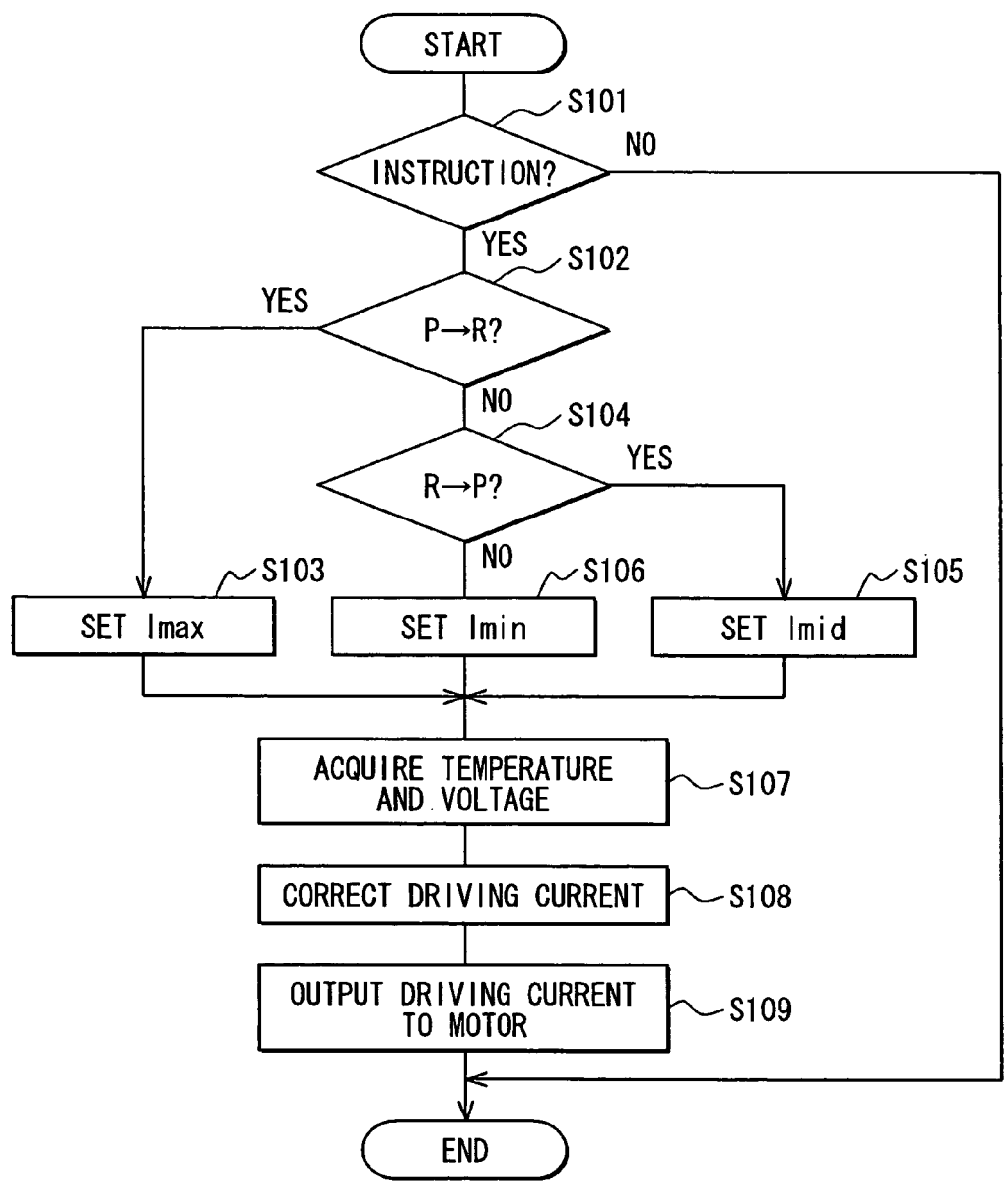
FIG. 4 is a flowchart showing an operation of the vehicle control system.

Subsequently, an operation of the vehicle control system 10 is described with reference to FIG. 4.

In step S101, the SBW-ECU 31 detects whether instructions of switching the shift range is input from the range selector 14. When the vehicle passenger manipulates the range selector 14, an electric signal is input from the selector sensor 15 into the SBW-ECU 31 according to the shift range as switched. When the SBW-ECU 31 detects a switching operation of the shift range, the SBW-ECU 31 detects a switching pattern. This switching pattern is a difference between the shift range before the switching operation and the shift range after the switching operation. When the shift ranges P, R, N, D are arranged on the range selector 14 as in this embodiment, the following switching patterns are set:

P range→R range;
R range→N range;
N range→D range;
D range→N range;
N range→R range; and
R range→P range.

The SBW-ECU 31 sets a value of an electric current, which is output to the motor 33, at one of multiple set values according to the switching pattern. In this embodiment, a set value set by the SBW-ECU 31 is one of Imax, Imid, and Imin. Imax is the maximum current value among the multiple set values. Imin is the minimum current value among the multiple set values. Imid is an intermediate value between Imax and Imin.

For example, when the vehicle passenger directly switches the range selector 14 from the P range to the N range, the SBW-ECU 31 recognizes the switching pattern of the shift range as two consecutive switching patterns of P range→R range and R range→N range.

In step S102, the SBW-ECU 31 evaluates whether the switching pattern input from the range selector 14 is P range→R range. When the switching pattern is P range→R range, the routine proceeds to step S103, in which the SBW-ECU 31 sets the set value of the driving current, which is output to the motor 33, at the maximum Imax. When the shift range of the automatic transmission 60 is in the P range, the pawl 94 of the lock arm 93 of the parking lock 90 gears with the recess 92 of the parking gear 91. Therefore, when the P range shifts to the R range, the motor 33 needs to generate force sufficient to release the locking of the parking lock 90, in addition to force for movement of the manual valve 62, which accompanies rotation of the detent plate 72. In particular, when the vehicle stops on a slope, the pawl 94 of the lock arm 93 and the parking gear 91 may gear firmly with each other. In such cases, large force is required to drive the cone head 96 together with the detent plate 72 to release locking of the parking lock 90. Driving force generated by the motor 33 substantially correlates with a magnitude of an electric current supplied to the motor 33. Thus, the SBW-ECU 31 sets the value of the driving current at the maximum value Imax.

In step S104, the SBW-ECU 31 evaluates whether the switching pattern is R range→P range when the switching pattern input from the range selector 14 is not P range→R range in step S102. When the switching pattern is R range→P range, the routine proceeds to step S105, in which the SBW-ECU 31 sets the set value at Imid. When the automatic transmission 60 is to be shifted to the P range, it is necessary to lock the parking lock 90 in contrast to the case where the P range is shifted to the R range. Therefore, when the R range is shifted to the P range, the motor 33 needs to generate force for locking of the parking lock 90, in addition to force for movement of the manual valve 62, which accompanies rotation of the detent plate 72. When the R range is shifted to the P range, the parking spring 97 needs to be compressed unless the pawl 94 of the lock arm 93 of the parking lock 90 synchronizes with the recess 92 of the parking gear 91. When an axle shaft rotates and the pawl 94 of the lock arm 93 synchronizes with the parking gear 91, the compressed force of the parking spring 97 is released and the pawl 94 gears with the parking gear 91. Consequently, when the switching pattern is R range→P range, the driving force demanded of the motor 33 becomes smaller than the driving force when the switching pattern is P range→R range. However, in this case, force for driving the parking lock 90 becomes necessary, so that the SBW-ECU 31 sets the set value at Imid being an intermediate value between Imax and Imin.

When the switching pattern input from the range selector 14 is neither P range→R range nor R range→P range in steps S102, S103, the routine proceeds to step S106, in which the SBW-ECU 31 sets the set value at the minimum Imin. Except when the automatic transmission 60 is shifted from the P range to the R range or from the R range to the P range, the motor 33 drives only the manual valve 62. Therefore, the motor 33 suffices to generate force for driving of the manual valve 62. Thereby, when the switching pattern is neither P range→R range nor R range→P range, the driving force demanded of the motor 33 becomes further smaller than the driving force when the switching pattern is R range→P range. Hereupon, the SBW-ECU 31 sets the value of the driving current, which is output to the motor 33, at Imin, which is further smaller than Imid.

Figure 5:
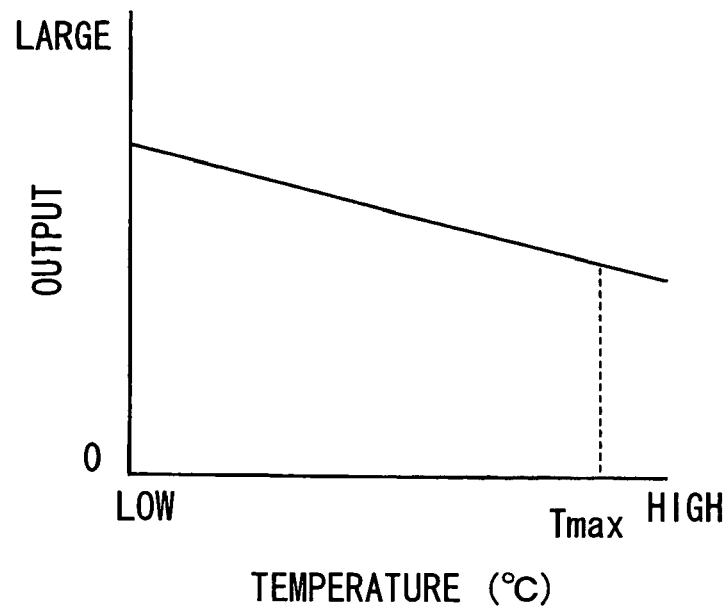
FIG. 5 is a graph showing a relationship between temperature in the vicinity of a motor of the vehicle control system and output of the motor.
Figure 6:
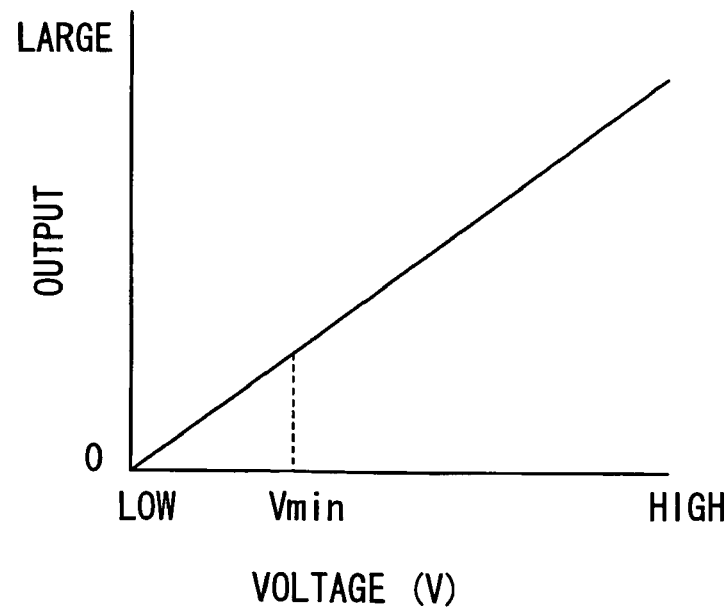
FIG. 6 is a graph showing a relationship between voltage of a battery of the vehicle control system and output of the motor.

In step S107, when the value of the driving current is set corresponding to the switching pattern, the SBW-ECU 31 acquires temperature in the vicinity of the motor 33 from the temperature sensor 37. The SBW-ECU 31 also acquires voltage of the battery 13 from the integrated ECU 11. The motor 33 has an electric load, equivalent to an electric resistance. Therefore, when temperature in the vicinity of the motor 33 varies, the resistance of the motor 33 also varies. When it is assumed that voltage supplied from the battery 13 is constant, the electric current flowing through the motor 33 varies as the resistance of the motor 33 varies. As shown in FIG. 5, when temperature in the vicinity of the motor 33 rises, the output of the motor 33 decreases. By contrast, when it is assumed that temperature in the vicinity of the motor 33 is constant, the electric current flowing through the motor 33 varies as the voltage of the battery 13 varies. Consequently, as shown in FIG. 6, when the voltage of the battery 13 decreases, the output of the motor 33 decreases. Accordingly, the output of the motor 33 varies in dependence upon temperature in the vicinity of the motor 33 and voltage of the battery 13.

The motor 33 of the actuator 32 drives the manual valve 62 for switching the shift range of the automatic transmission 60. Therefore, when output of the motor 33 becomes insufficient, the manual valve 62 cannot be driven to a predetermined position and switching of the shift range of the automatic transmission 60 cannot be appropriately executed in some cases. Hereupon, conventionally, even when temperature in the vicinity of the motor 33 is an assumed maximum temperature Tmax and voltage of the battery 13 is an assumed minimum voltage Vmin, the electric current supplied to the motor 33 is set such that the motor 33 generates the maximum output, which is capable of shifting the shift range from the P range to the R range. Consequently, even when large driving force is not demanded of the motor 33 as when the shift range is shifted to, for example, the D range from the N range, the electric current for generation of large driving force is supplied to the motor 33. As a result, power consumption of the motor 33 improperly increases, and an excessive load is imposed on the automatic transmission 60, which includes the actuator 32 constructed of the motor 33, the driving force transmission unit 70, and the manual valve 62.

In step S108, hereupon, in this embodiment, when the value of the driving current is set corresponding to the switching pattern, the SBW-ECU 31 corrects the value of the set driving current in accordance with temperature in the vicinity of the motor 33 and voltage of the battery 13. Thereby, the motor 33 generates the driving current necessary and sufficient for the manual valve 62 to switch the shift range of the automatic transmission 60. Thus, the load applied to the automatic transmission 60, which includes the actuator 32, can be reduced.

In addition, when a current limiting control is executed to restrict the maximum value of the electric current supplied to the motor 33, the SBW-ECU 31 suffices to control the supplied electric current within the value, which is set corresponding to the switching pattern, as an upper limit. Therefore, in the current limiting control, correction based on temperature in the vicinity of the motor 33 and voltage of the battery 13 may be omitted.

In step S109, the SBW-ECU 31 outputs the electric current to the motor 33 by the corrected set value, so that the motor 33 generates the driving force. Thus, an appropriate driving force generated from the motor 33 is transmitted to the manual valve 62 via the driving force transmission unit 70. Thereby, the shift range of the automatic transmission 60 is switched over to the shift range input from the range selector 14.

In accordance with the above procedure, the motor 33 generates appropriate driving force corresponding to the switching pattern. The motor 33 can be restricted from being supplied with an excessive current, so that power consumption of the motor 33 can be reduced. In addition, the motor 33, the driving force transmission unit 70, and the automatic transmission 60 can be restricted from being imposed with an excessive load caused by an excessive driving force.

Other Embodiments

In the vehicle control system 10, the SBW-ECU 31 may execute a tapping control in the operation of the driving force transmission unit 70. As described above, the driving force output from the motor 33 is transmitted to the manual valve 62 via a reduction gear (not shown) and the driving force transmission unit 70. The vehicle control system 10 including the SBW device 30 executes the tapping control in order to detect a reference position, which defines a reference of the rotation angle, when an operation is started, or when the rotation angle of the motor 33 is indefinite. In the tapping control, the SBW-ECU 31 rotates the motor 33 until the driving force transmission unit 70 reaches one limit position of a movable range. More specifically, the SBW-ECU 31 operates the motor 33 to rotationally drive the drive shaft 71 until the stopper 73 collides against a wall of the detent plate 72 defining the P range on the side of the R range or a wall of the detent plate 72 defining the P range on the opposite side of the R range. The SBW-ECU 31 stores a position, in which the stopper 73 collides against the wall of the detent plate 72 so that rotation of the drive shaft 71 stops, as the reference position of the rotation control of the drive shaft 71. This reference position of the drive shaft 71 is equivalent to a reference position of rotation of the motor 33.

In this tapping control, the SBW-ECU 31 rotates the motor 33 to an extent that the shift range of the automatic transmission 60 is not changed, until the stopper 73 collides against the wall of the detent plate 72. Since the tapping control is not accompanied by switching the shift range of the automatic transmission 60, the driving force generated from the motor 33 suffices to be small. Hereupon, the SBW-ECU 31 sets the set value at Imin in the tapping control, so that electric power consumed by the motor 33 can be reduced, and a load applied to both the motor 33 and the driving force transmission unit 70 can be reduced in the tapping control. In addition, in the tapping control, the SBW-ECU 31 may set the set value of the driving current to be smaller than Imin.

The above shift range positions including the P range, the R range, the N range, and the D range are one example. The shift range positions may be defined as appropriate. For example, the D range may be divided into at least two ranges, such as 1 to 5 speeds.

The shift range switching apparatus is not limited to application for an automatic transmission for an internal combustion engine. The shift range switching apparatus can be applied to an automatic transmission for various vehicles such as an electric automobile and a hybrid car.

It should be appreciated that while the processes of the embodiments have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A shift range switching apparatus for a motor used for switching a shift range of an automatic transmission, the shift range switching apparatus comprising:
   a switching unit that is operated by the motor for switching the shift range;
   a control unit that outputs a driving current to the motor for switching the shift range to one of a P range, an R range, an N range, and a D range; and
   a selector sensor that detects the shift range, which is changed by a switch operation of an occupant, and outputs a signal which corresponds to the shift range,
   wherein the control unit uses the signal from the selector sensor to control the driving current to be one of a plurality of preset values in accordance with a switching pattern which is determined based on a difference between the shift range before the switching operation and the shift range after the switching operation;
   a temperature detection unit that detects temperature in the vicinity of the motor; and
   a voltage detection unit that detects voltage of a battery which supplies electric power to the motor,
   wherein the control unit corrects the selected one of the plurality of preset values on the basis of at least one of (a) the temperature in the vicinity of the motor, and (b) the voltage of the battery.

2. The shift range switching apparatus according to claim 1, wherein:
   the plurality of preset values includes a maximum value, which is largest thereamong, and
   the control unit controls the driving current at the maximum value when the switching pattern is set from the P range to the R range.

3. The shift range switching apparatus according to claim 1, wherein:
   the plurality of preset values includes a minimum value, which is smallest thereamong, the plurality of preset values includes an intermediate value between a maximum value and minimum value, and
   the control unit controls the driving current at the intermediate value when the switching pattern is set from the R range to the P range.

4. The shift range switching apparatus according to claim 1, wherein:
   the plurality of preset values includes a minimum value, which is smallest thereamong, and
   the control unit controls the driving current at the minimum value except when one of the following conditions is satisfied:
   the switching pattern is set from the P range to the R range; and
   the switching pattern is set from the R range to the P range.

5. The shift range switching apparatus according to claim 1, wherein:
   the switching unit further includes a transmission unit that transmits driving force from the motor to the automatic transmission, and
   the control unit controls the driving current at a value equal to or less than a minimum value in a tapping control, in which the control unit operates the transmission unit to one limit position of a movable range of the transmission unit.

6. The shift range switching apparatus according to claim 1, wherein the switching pattern is a combination of two of the P range, the R range, the N range, and the D range.

7. The shift range switching apparatus according to claim 1, wherein the selector sensor directly detects the shift range.

8. A method for switching a shift range of an automatic transmission, the method comprising:
   detecting the shift range, which is changed by a switching operation of an occupant;
   determining a switching pattern based on a difference between the detected shift range before the switching operation and the detected shift range after the switching operation;
   detecting temperature in the vicinity of the motor;
   detecting voltage of a battery which supplies electric power to the motor;
   controlling the driving current to be a selected one of a plurality of preset values in accordance with the switching pattern, the switching pattern being a combination of two of a P range, an R range, an N range, and a D range; and
   correcting at least said selected one of the plurality of preset values on the basis of at least one of (a) the temperature in the vicinity of the motor, and (b) the voltage of the battery.

9. A shift range switching apparatus for a motor for switching a shift range of an automatic transmission, the shift range switching apparatus comprising:
   a switching unit that is operated by a motor for switching the shift range;
   a control unit that outputs a driving current to the motor for switching the shift range to one of a P range, an R range, an N range and a D range, wherein the control unit controls the driving current to be a selected one of a plurality of preset values in accordance with a switching pattern of the shift range;
   a temperature detection unit that detects temperature in the vicinity of the motor; and
   a voltage detection unit that detects voltage of a battery which supplies electric power to the motor,
   wherein the control unit corrects at least the selected one of the plurality of preset values on the basis of at least one of (a) the temperature in the vicinity of the motor, and (b) the voltage of the battery.

10. A method for switching a shift range of an automatic transmission, the method comprising:
    detecting temperature in the vicinity of a motor;
    detecting voltage of a battery, which is for supplying electric power to the motor;
    correcting at least a selected one of a plurality of preset values on the basis of at least one of (a) the temperature, and (b) the voltage; and
    controlling a driving current of the motor to be the selected one of the plurality of preset values for switching the shift range in accordance with a switching pattern, which is a combination of two of a P range, an R range, an N range and a D range of the shift range.

11. A vehicular transmission range switching apparatus comprising:

an electric motor disposed to mechanically move a vehicular transmission shift range controlling device between at least park (P), reverse (R), neutral (N) and drive (D) shift range positions in response to electrical driving current supplied to the electric motor;

an operator-controlled shift range selector which outputs electrical signals representing position of said selector at positions corresponding to said P, R, N and D shift ranges;

a motor control unit connected to receive said selector output electrical signals and to drive said electric motor with driving current that is varied as a function of detected transitions between said selector positions P, R, N and D;

a temperature detection unit that detects temperature in the vicinity of the motor; and a voltage detection unit that detects voltage of a battery which supplies electric power to the motor, wherein the control unit corrects at least a selected one of a plurality of preset values of current on the basis of at least one of (a) the temperature in the vicinity of the motor, and (b) the voltage of the battery and supplies such corrected preset value of current as said motor driving current.

12. A method for controlling a vehicular transmission range switching apparatus, said method comprising:

using an electric motor to mechanically move a vehicular transmission shift range controlling device between at least park (P), reverse (R), neutral (N) and drive (D) shift range positions in response to electrical driving current supplied to the electric motor;

using an operator-controlled shift range selector to generate output electrical signals representing position of said selector at positions corresponding to said P, R, N and D shift ranges;

detecting temperature in the vicinity of the electric motor;

detecting voltage of a battery which supplies electric power to the electric motor;

driving said electric motor with a selected one of plural preset driving current values that are varied as a function of detected transitions between said selector positions P, R, N and D; and correcting said selected one of the plurality of preset values on the basis of at least one of (a) the temperature in the vicinity of the motor, and (b) the voltage of the battery.

* * * * *